(12) United States Patent
Lai et al.

(10) Patent No.: US 12,490,352 B2
(45) Date of Patent: Dec. 2, 2025

(54) LED MODULE LAMP CONTROL DEVICE USING PULL CHAIN SWITCH

(71) Applicant: Idea DC Motor & LED Co., Ltd, Zhongshan (CN)

(72) Inventors: Yuanfeng Lai, Zhongshan (CN); Zibai Yu, Zhongshan (CN); Yuanzhong Lai, Zhongshan (CN); Chuiyou Guo, Zhongshan (CN)

(73) Assignee: Idea DC Motor & LED Co., Ltd, Zhongshan (CN)

( * ) Notice: Subject to any disclaimer, the term of this patent is extended or adjusted under 35 U.S.C. 154(b) by 109 days.

(21) Appl. No.: 18/438,815

(22) Filed: Feb. 12, 2024

(65) Prior Publication Data

US 2024/0341016 A1 Oct. 10, 2024

(30) Foreign Application Priority Data

Apr. 7, 2023 (CN) .......................... 202320761536.X

(51) Int. Cl.
*H05B 45/30* (2020.01)
*H05B 45/14* (2020.01)
*H05B 45/20* (2020.01)
*H05B 45/325* (2020.01)
*H05B 45/345* (2020.01)

(52) U.S. Cl.
CPC ............ *H05B 45/14* (2020.01); *H05B 45/20* (2020.01); *H05B 45/325* (2020.01); *H05B 45/345* (2020.01)

(58) Field of Classification Search
CPC ........ H05B 45/10; H05B 45/14; H05B 45/20; H05B 45/30; H05B 45/325; H05B 45/345; H05B 47/10
See application file for complete search history.

(56) References Cited

U.S. PATENT DOCUMENTS

2022/0039223 A1\* 2/2022 Zhou ................... H05B 45/325

FOREIGN PATENT DOCUMENTS

CN 111885779 A \* 11/2020 ............. H05B 45/46

\* cited by examiner

*Primary Examiner* — Jimmy T Vu
(74) *Attorney, Agent, or Firm* — Daylight Law, P.C.

(57) ABSTRACT

A LED module lamp control device using pull chain switch is disclosed, including a light-emitting assembly, a pull chain switch assembly, a control module, a power drive module and a dimming drive module. The pull chain switch assembly is configured to form a switch signal when being driven, the control module is provided with a signal input terminal, the signal input terminal of the control module is connected to the pull chain switch assembly to acquire a switch signal, the power drive module is configured to connect to a power supply, the dimming drive module is connected to the light-emitting assembly to form at least part of a dimming drive branch, the power drive module is connected to the dimming drive branch to supply power to the light-emitting assembly, and the control module is connected to a controlled end of the dimming drive module.

8 Claims, 4 Drawing Sheets

LED MODULE LAMP CONTROL DEVICE USING PULL CHAIN SWITCH

CROSS-REFERENCE TO RELATED APPLICATION

This application is based on and claims the benefit of priority from Chinese Patent Application No. 202320761536X, filed on 7 Apr. 2023, the entirety of which is incorporated by reference herein.

TECHNICAL FIELD

The present disclosure relates to the technical field of lighting equipment, and in particular, to a LED module lamp control device using pull chain switch.

BACKGROUND

There are many lamps using pull chain switches on the market. The pull chain switch can have a decorative effect in some scenarios and can also give a user a unique use experience, and thus is favored by certain user groups.

However, for the existing lamp provided with the pull chain switch, the pull chain switch is generally connected in series into a power supply branch of the lamp, and the pull chain switch can be switched between a turn-on state and a turn-off state by pulling the pull chain switch, so that the lamp is turned on/off. However, it is difficult to meet the requirements of a user for the use of the lamp at present by simply turning on/off the lamp.

SUMMARY

The present disclosure aims to at least solve one of the technical problems in the conventional technology. Therefore, the present disclosure provides a LED module lamp control device using pull chain switch, which can achieve control of dimming, color adjustment and on/off of a lamp through a pull chain switch assembly. The device is convenient and reliable to use, thus meeting the requirements of users.

A LED module lamp control device using pull chain switch according to an embodiment of a first aspect of the present disclosure comprises: a light-emitting assembly; a pull chain switch assembly forming a switch signal when being driven, wherein the switch signal is used to represent that the pull chain switch assembly is switched from a turn-on state to a turn-off state or from a turn-off state to a turn-on state; a control module having a signal input terminal, wherein the signal input terminal of the control module is connected to the pull chain switch assembly to obtain a switch signal; a power drive module configured to connect to a power supply; and a dimming drive module connected to the light-emitting assembly to form at least part of a dimming drive branch, wherein the power drive module is connected to the dimming drive branch to supply power to the light-emitting assembly, the control module is connected to a controlled end of the dimming drive module, the control module forms a control signal according to the switch signal and outputs the control signal to control the dimming drive module to adjust a brightness, a color temperature or on/off of the light-emitting assembly.

The LED module lamp control device using pull chain switch according to an embodiment of the present disclosure at least has the following beneficial effects.

According to the lamp control device using pull chain switch of the present disclosure, the power drive module processes a power supply to supply power to the light-emitting assembly, when a user acts on the pull chain switch assembly, the pull chain switch assembly can be switched from a turn-on state to a turn-off state or from a turn-off state to a turn-on state, so that a signal input terminal of the control module can acquire a switch signal and form a control signal by using the switch signal, and the control signal can control the dimming drive module to operate, thereby adjusting the on/off, brightness or color temperature of the light-emitting assembly. This design can achieve control of dimming, color adjustment and on/off of a lamp through the pull chain switch assembly, so that the control to the light-emitting assembly is more diversified and reliable, thus meeting the requirements of users.

According to some embodiments of the present disclosure, the pull chain switch assembly comprises a base shell, a rotating wheel and a chain, the base shell is provided with a first electrical connection terminal and a second electrical connection terminal, the control module is connected to the first electrical connection terminal and the second electrical connection terminal, the rotating wheel is rotatably arranged on the base shell, the rotating wheel is provided with a conductive part, the chain is connected to the rotating wheel, pulling of the chain is capable of driving the rotating wheel to rotate to switch at least between a first position and a second position, where in the first position state, one end of the conductive part is in conductive contact with the first electrical connection terminal and the other end of the conductive part is in conductive contact with the second electrical connection terminal, and in the second position state, the conductive part is separated from the first electrical connection terminal and the second electrical connection terminal.

According to some embodiments of the present disclosure, a filter capacitor is connected between the first electrical connection terminal and the second electrical connection terminal.

According to some embodiments of the present disclosure, the lamp control device using pull chain switch further comprises a filter capacitor, the first electrical connection terminal is connected to the control module, the second electrical connection terminal is connected to one end of the filter capacitor, the other end of the filter capacitor is connected to the control module, and the other end of the filter capacitor is grounded.

According to some embodiments of the present disclosure, the dimming drive module comprises a first switching transistor and a second switching transistor, the light-emitting assembly comprises a first lamp group and a second lamp group with different colors, the first switching transistor is connected to the first lamp group to form a first series branch, the second switching transistor is connected to the second lamp group to form a second series branch, the power drive module is connected to the first series branch and the second series branch to supply power to the first series branch and the second series branch, and the control module is connected to a controlled end of the first switching transistor and a controlled end of the second switching transistor.

According to some embodiments of the present disclosure, the lamp control device using pull chain switch further comprises a coupling isolation module, and the control module is connected to the controlled end of the dimming drive module through the coupling isolation module.

According to some embodiments of the present disclosure, the coupling isolation module comprises a first coupling isolation unit and a second coupling isolation unit, the control module is connected to the controlled end of the first switching transistor through the first coupling isolation unit, and the control module is connected to the controlled end of the second switching transistor through the second coupling isolation unit.

According to some embodiments of the present disclosure, the power drive module comprises a rectifier unit, a constant current control unit and a current-limiting switch unit, an input end of the rectifier unit is connected to a power supply, an output end of the rectifier unit is connected to the dimming drive branch to supply power to the dimming drive branch, the constant current control unit is connected to the dimming drive branch to sample drive branch current information of the dimming drive branch, the current-limiting switch unit is connected to the dimming drive branch, the constant current control unit is connected to a controlled end of the current-limiting switch unit, and the constant current control unit controls a switching frequency of the current-limiting switch unit to adjust a magnitude of a drive branch current.

According to some embodiments of the present disclosure, the power drive module further comprises a current detection unit, the current detection unit is connected to the dimming drive branch to detect drive branch current information of the dimming drive branch, and the constant current control unit is connected to the current detection unit to sample the drive branch current information of the dimming drive branch.

Additional aspects and advantages of the present disclosure will be set forth in part in the following description, some of which will be apparent from the following description, or will be learned by practice of the present disclosure.

BRIEF DESCRIPTION OF DRAWINGS

The above and/or additional aspects and advantages of the present disclosure will become apparent and readily appreciated from the following description of the embodiments with reference to the accompanying drawings.

REFERENCE NUMERALS

Figure 1:
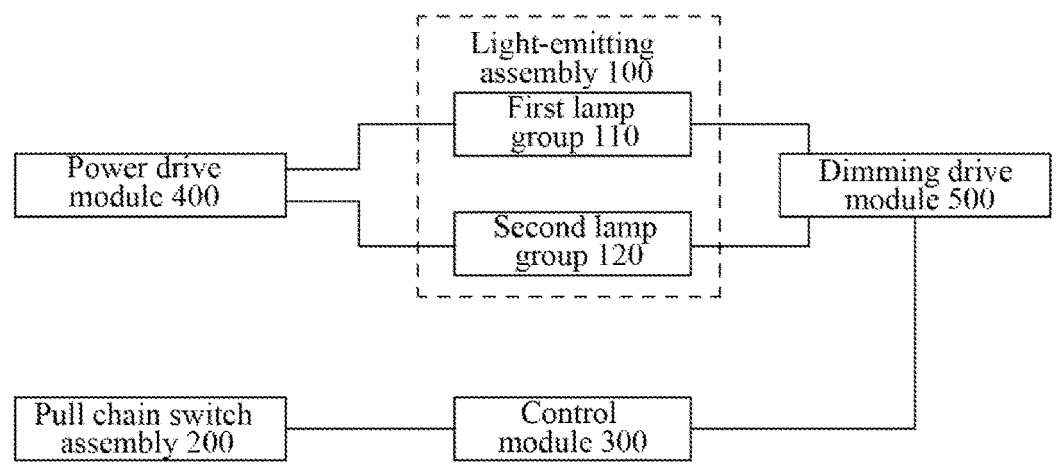
FIG. 1 is a schematic diagram of a lamp control device using pull chain switch according to an embodiment of the present disclosure.

100: light-emitting assembly; 110: first lamp group; 120: second lamp group; 200: pull chain switch assembly; 300: control module; 400: power drive module; 410: rectifier unit; 420: constant current control unit; 430: current-limiting switch unit; 440: current detection unit; 500: dimming drive module; 510: first switching transistor; 520: second switching transistor; 600: filter capacitor; 710: first coupling isolation unit; 720: second coupling isolation unit.

DETAILED DESCRIPTION

Embodiments of the present disclosure will be described in detail below, and examples of the embodiments are shown in the accompanying drawings, where the same or similar reference numerals indicate the same or similar elements or elements having the same or similar functions throughout. The embodiments described below with reference to the accompanying drawings are illustrative only for the purpose of explaining the present disclosure, and are not to be construed as limiting the present disclosure.

In the description of the present disclosure, it should be noted that the directions or positional relationships indicated by terms such as "upper", "lower", "front", "rear", "left", "right", "vertical", "horizontal", "top", "bottom", "inner", "outer", and the like are based on the accompanying drawings, are merely intended to facilitate and simplify description rather than indicate or imply that the indicated device or element must have a specific direction and be structured and operated according to the specific direction, and should not be construed as limiting the present disclosure.

In the description of the present disclosure, "several" means one or more, "a plurality of" means two or more, "greater than", "less than", "more than" and the like are understood as excluding the following number, and "above", "below", "within" and the like are understood as including the following number. The description of "first" and "second" is merely for the purpose of distinguishing technical features, but shall not be understood as an indication or implication of relative importance, or an implicit indication of a quantity of indicated technical features, or an implicit indication of the sequence of the indicated technical features.

In the description of the present disclosure, it should be noted that unless otherwise expressly specified and limited, terms "mount", "interconnect", and "connect" should be understood in a broad sense. For example, such terms may indicate a fixed connection, a detachable connection, or an integral connection; may indicate a mechanical connection or an electrical connection; and may indicate direct interconnection, indirect interconnection through an intermediate medium, or internal communication between two elements. Those of ordinary skill in the art may understand specific meanings of the foregoing terms in the present disclosure according to specific cases.

As shown in FIGS. 1 to 5, a LED module lamp control device using pull chain switch according to an embodiment of a first aspect of the present disclosure comprises: a light-emitting assembly 100, a pull chain switch assembly 200, a control module 300, a power drive module 400 and a dimming drive module 500, wherein the pull chain switch assembly 200 is configured to form a switch signal when being driven, the switch signal is used to represent that the pull chain switch assembly 200 is switched from a turn-on state to a turn-off state or from a turn-off state to a turn-on state, the control module 300 has a signal input terminal, the signal input terminal of the control module 300 is connected to the pull chain switch assembly 200 to acquire the switch signal, the power drive module 400 is configured to connect to a power supply, the dimming drive module 500 is connected to the light-emitting assembly 100 to form at least part of a dimming drive branch, the power drive module 400 is connected to the dimming drive branch to supply power to the light-emitting assembly 100, the control module 300 is connected to a controlled end of the dimming drive module 500, the control module 300 forms a control signal according to the switch signal and outputs the control signal to control the dimming drive module 500 to adjust a brightness, a color temperature or on/off of the light-emitting assembly 100.

The control module 300 may be selected from conventional chips having a processing function and a PWM signal modulation function. Specifically, a signal input terminal may comprise a level sampling terminal and a ground terminal of the control module 300, the level sampling terminal of the control module 300 applies a voltage to one end of the pull chain switch assembly 200, the other end of the pull chain switch assembly 200 is grounded. When the pull chain switch assembly 200 is switched from a turn-off state to a turn-on state, the level sampling terminal of the control module 300 detects a low level to form a switch signal. When the pull chain switch assembly 200 is switched from a turn-on state to a turn-off state, the level sampling terminal of the control module 300 detects a high level to form a switch signal.

Specifically, when a user pulls the pull chain switch assembly 200, the control module can control the light-emitting assembly 100 to turn on/off the light; when a user pulls the pull chain switch assembly two times within 1 second (this time may be set based on an actual situation), the control module controls color adjustment of the light-emitting assembly 100; and when a user pulls the pull chain switch assembly for a period of time, the control module controls brightness adjustment of the light-emitting assembly 100.

According to the lamp control device using pull chain switch of the present disclosure, the power drive module 400 processes a power supply to supply power to the light-emitting assembly 100. When a user acts on the pull chain switch assembly 200, the pull chain switch assembly 200 can be switched from a turn-on state to a turn-off state or from a turn-off state to a turn-on state, so that a signal input terminal of the control module 300 can acquire a switch signal and form a control signal by using the switch signal, and the control signal can control the dimming drive module 500 to operate, thereby adjusting the on/off, a brightness or a color temperature of the light-emitting assembly 100. This design can achieve control of dimming, color adjustment and on/off of a lamp through the pull chain switch assembly 200, so that the control to the light-emitting assembly 100 is more diversified and reliable, thus meeting the requirements of users.

In some embodiments of the present disclosure, the pull chain switch assembly 200 comprises a base shell, a rotating wheel and a chain (not shown), the base shell is provided with a first electrical connection terminal and a second electrical connection terminal, the control module 300 is connected to the first electrical connection terminal and the second electrical connection terminal, the rotating wheel is rotatably arranged on the base shell, the rotating wheel is provided with a conductive part, the chain is connected to the rotating wheel, the chain is pulled to drive the rotating wheel to rotate to switch at least between a first position and a second position, where in the first position state, one end of the conductive part is in conductive contact with the first electrical connection terminal and the other end of the conductive part is in conductive contact with the second electrical connection terminal, and in the second position state, the conductive part is separated from the first electrical connection terminal and the second electrical connection terminal.

In the first position state, the pull chain switch assembly 200 is turned on to form one switch signal, and similarly, in the second position state, the pull chain switch assembly 200 is turned off to form the other switch signal.

Specifically, the conductive part on the rotating wheel may be a conductive metal strip arranged on the rotating wheel, two ends of the conductive metal strip protrude out of a sidewall of the rotating wheel so as to be in conductive contact with the first electrical connection terminal and the second electrical connection terminal, and both the first electrical connection terminal and the second electrical connection terminal may be conductive contacts.

Figure 3:
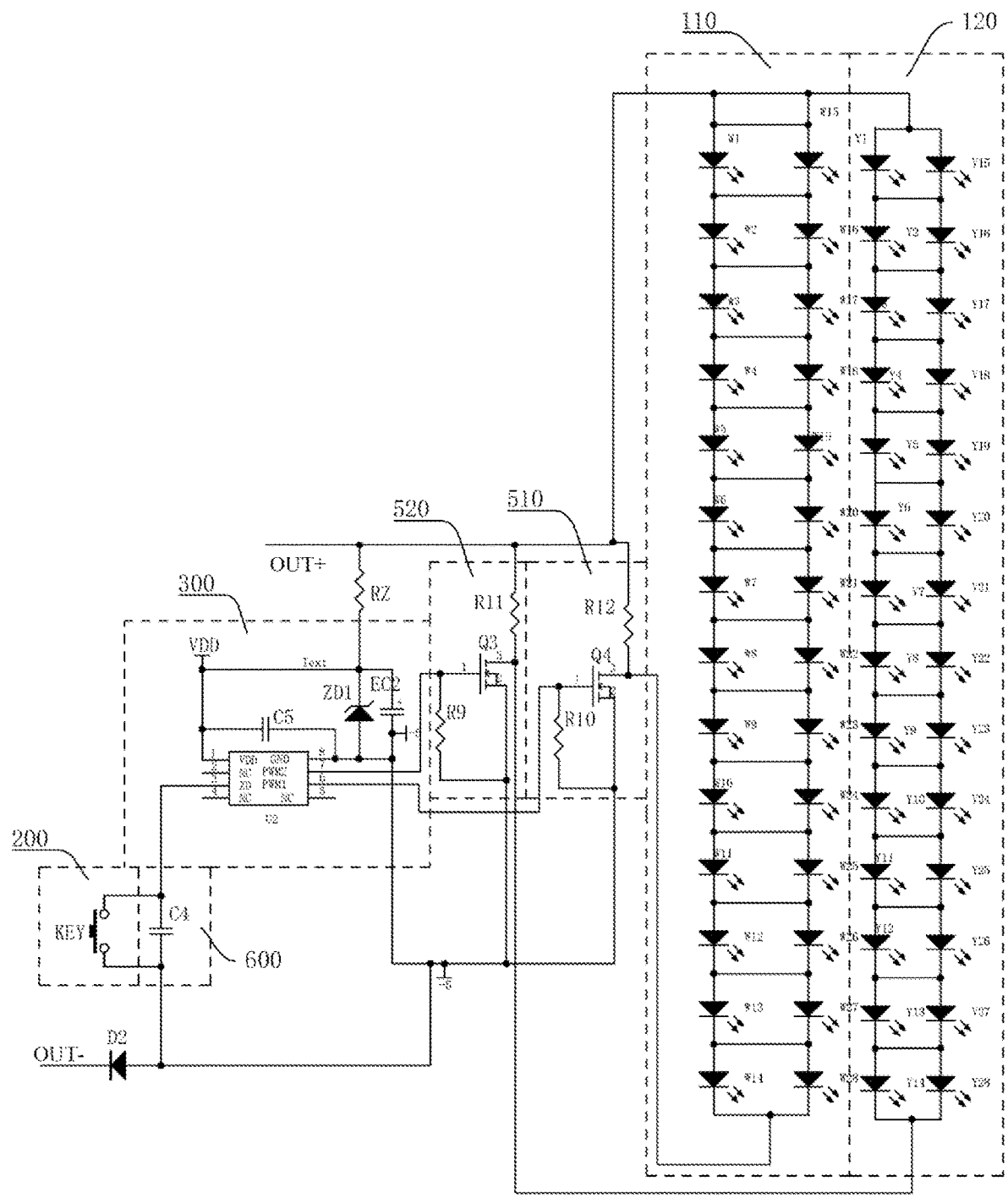
FIG. 3 is a schematic diagram of a circuit of a control module and a dimming drive branch of the lamp control device using pull chain switch according to the first embodiment of the present disclosure.

In some embodiments of the present disclosure, as shown in FIG. 3, a filter capacitor 600 is connected between the first electrical connection terminal and the second electrical connection terminal.

The first electrical connection terminal may be connected to one end of the control module 300, and the second electrical connection terminal may be grounded or connected to a ground terminal of the control module 300. The filter capacitor 600 can filter out the jitter interference of the pull chain switch assembly 200, and reduce the occurrence of touch by mistake.

Figure 5:
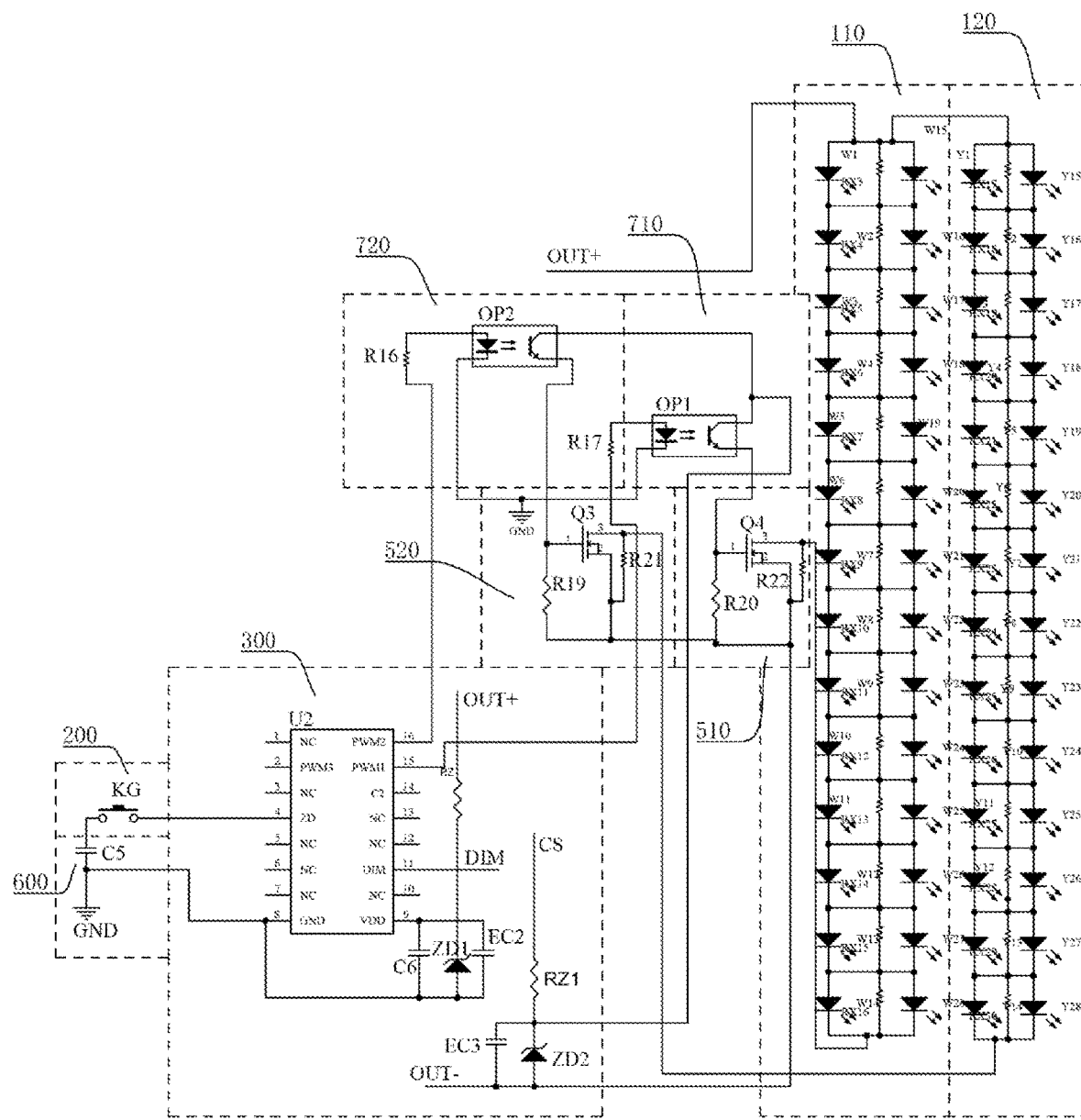
FIG. 5 is a schematic diagram of a circuit of a control module and a dimming drive branch of the lamp control device using pull chain switch according to the second embodiment of the present disclosure.

In some embodiments of the present disclosure, as shown in FIG. 5, the lamp control device using pull chain switch further comprises a filter capacitor 600, the first electrical connection terminal is connected to the control module 300, the second electrical connection terminal is connected to one end of the filter capacitor 600, the other end of the filter capacitor 600 is connected to the control module 300, and the other end of the filter capacitor 600 is grounded. Similarly, this filter capacitor 600 can filter out the jitter interference of the pull chain switch assembly 200, thereby reducing the occurrence of the risk of touch by mistake.

In some embodiments of the present disclosure, as shown in FIGS. 3 and 5, the dimming drive module 500 comprises a first switching transistor 510 and a second switching transistor 520, the light-emitting assembly 100 comprises a first lamp group 110 and a second lamp group 120 with different colors, the first switching transistor 510 is connected to the first lamp group 110 to form a first series branch, the second switching transistor 520 is connected to the second lamp group 120 to form a second series branch, the power drive module 400 is connected to the first series branch and the second series branch to supply power to the first series branch and the second series branch, and the control module 300 is connected to a controlled end of the first switching transistor 510 and a controlled end of the second switching transistor 520.

Both the first switching transistor 510 and the second switching transistor 520 may be selected as triodes, MOS transistors and the like, the control module 300 modulates and outputs PWM signals to the first switching transistor 510 and the second switching transistor 520 separately, and adjusts currents flowing through the first lamp group 110 and the second lamp group 120 by controlling conduction thresholds of the first switching transistor 510 and the second switching transistor 520, thereby adjusting brightness of the first lamp group 110 and the second lamp group 120. Meanwhile, colors of the first lamp group 110 and the second lamp group 120 are different, and by adjusting on/off frequencies of the first lamp group 110 and the second lamp group 120, colors of mixed lights emitted by the first lamp group 110 and the second lamp group 120 can be adjusted.

Specifically, the first lamp group 110 and the second lamp group 120 may both be formed by LED lamp beads.

In some embodiments of the present disclosure, as shown in FIG. 5, the lamp control device using pull chain switch further comprises a coupling isolation module, and the control module 300 is connected to the controlled end of the dimming drive module 500 through the coupling isolation module.

The coupling isolation module can separate a high-voltage part and a low-voltage part of the lamp control device using pull chain switch, the power supply supplies power to the light-emitting assembly 100, and interference signals are less likely to enter the control module 300 and affect a control logic of the control module 300, so that the control module 300 can more accurately adjust the operating state of the light-emitting assembly 100.

Specifically, the coupling isolation module comprises a first coupling isolation unit 710 and a second coupling isolation unit 720, the control module 300 is connected to the controlled end of the first switching transistor 510 through the first coupling isolation unit 710, and the control module 300 is connected to the controlled end of the second switching transistor 520 through the second coupling isolation unit 720, and both the first coupling isolation unit 710 and the second coupling isolation unit 720 may use an optical coupler or a magnetoelectric coupler.

Figure 2:
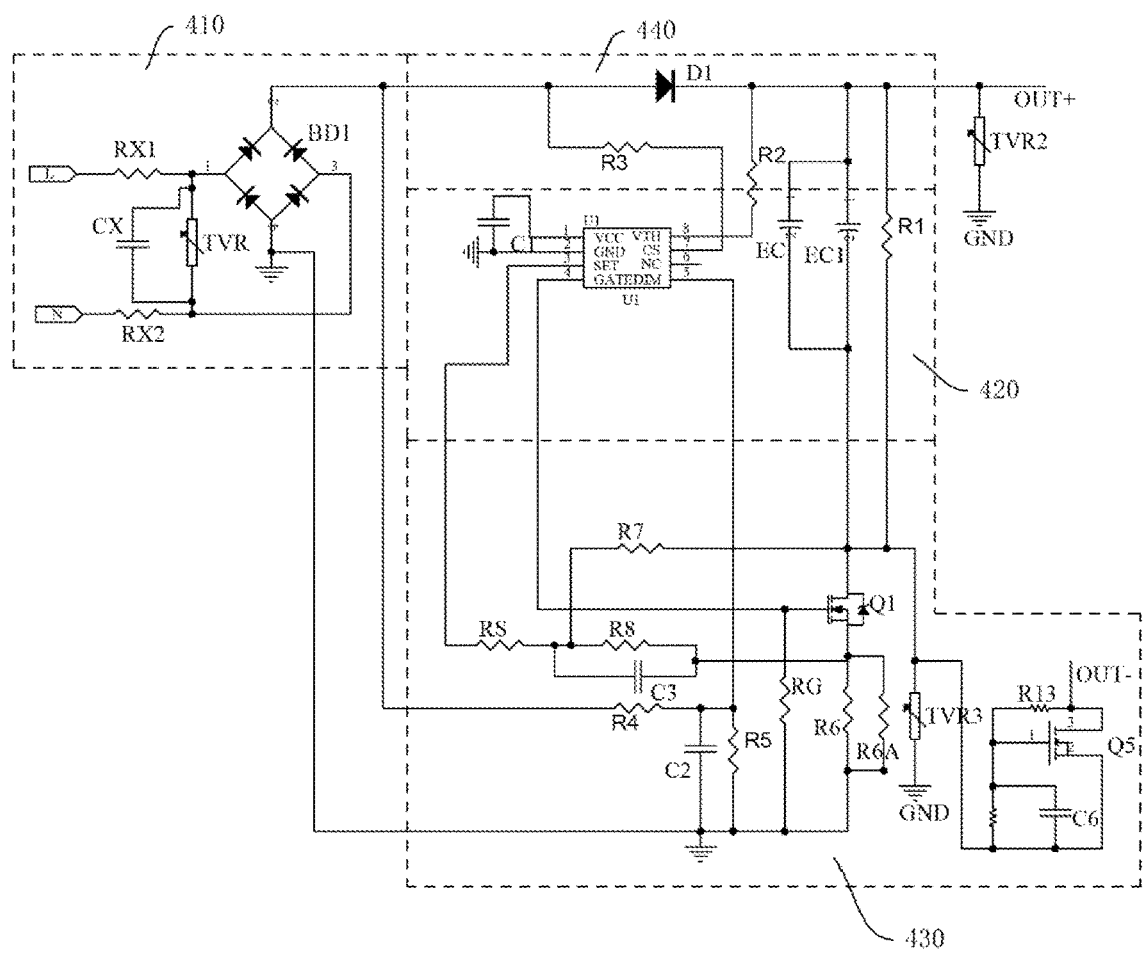
FIG. 2 is a schematic diagram of a circuit of a power drive module of the lamp control device using pull chain switch according to a first embodiment of the present disclosure.
Figure 4:
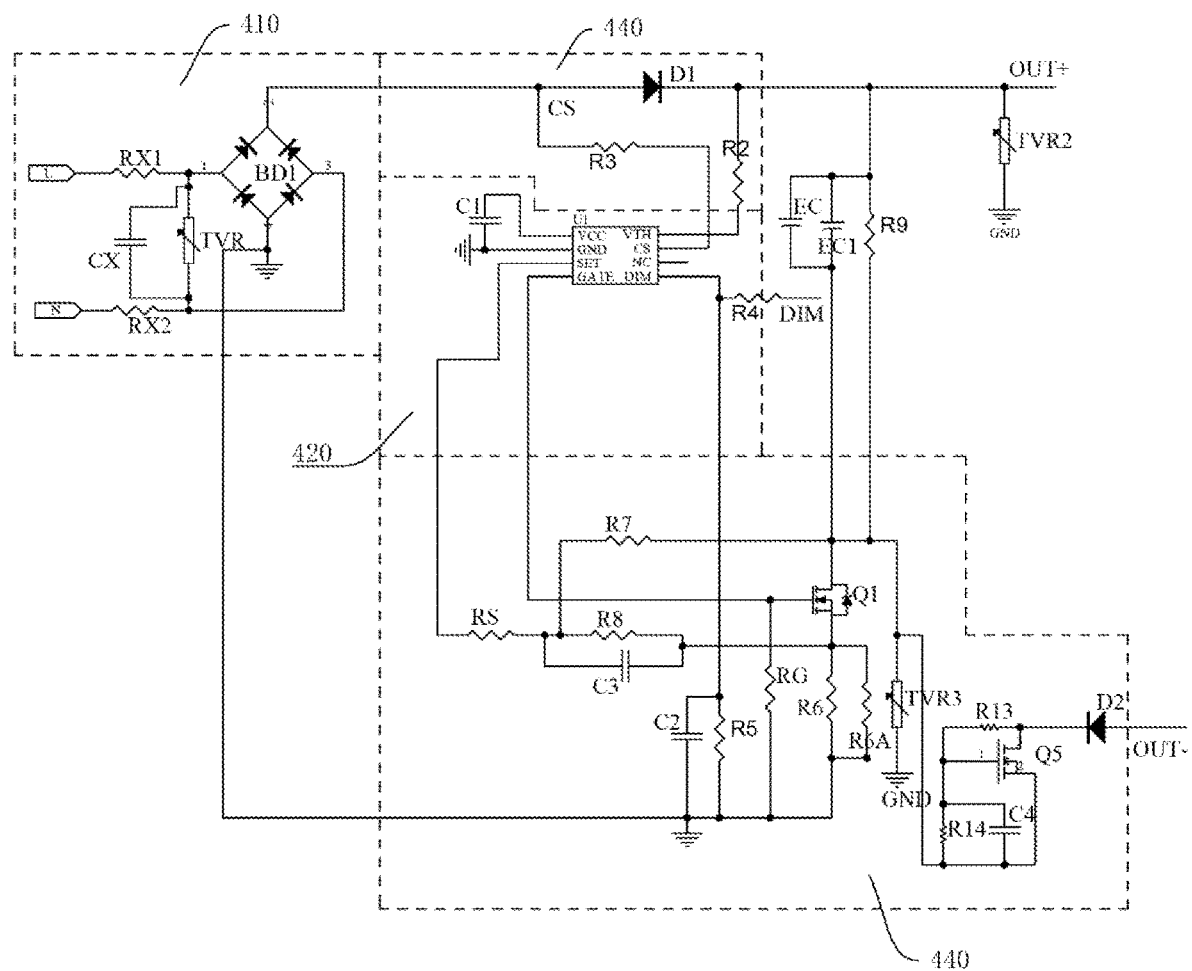
FIG. 4 is a schematic diagram of a circuit of a power drive module of the lamp control device using pull chain switch according to a second embodiment of the present disclosure.

In some embodiments of the present disclosure, as shown in FIGS. 2 and 4, the power drive module 400 comprises a rectifier unit 410, a constant current control unit 420 and a current-limiting switch unit 430, an input end of the rectifier unit 410 is connected to a power supply, an output end of the rectifier unit 410 is connected to the dimming drive branch to supply power to the dimming drive branch, the constant current control unit 420 is connected to the dimming drive branch to sample drive branch current information of the dimming drive branch, the current-limiting switch unit 430 is connected to the dimming drive branch, the constant current control unit 420 is connected to a controlled end of the current-limiting switch unit 430, and the constant current control unit 420 controls a switching frequency of the current-limiting switch unit 430 to adjust a magnitude of a drive branch current.

The rectifier unit 410 may be selected from conventional rectifier bridge components, the constant current control unit 420 may be selected from MCU, CPU, or chips having a processing function and a PWM signal modulation function, the current-limiting switch unit 430 is connected to the dimming drive branch, and the constant current control unit 420 controls a conduction threshold of the current-limiting switch unit 430 to control a main current flowing into the dimming drive branch, thereby implementing constant current output.

Specifically, the dimming drive branch may use a triode, a MOS transistor, an IGBT, or the like.

A chip used by part of the constant current control unit 420 has a current sampling function, a sampling end of the constant current control unit 420 is connected with the dimming drive branch to acquire drive branch current information. In some embodiments of the present disclosure, the power drive module 400 further comprises a current detection unit 440, the current detection unit 440 is connected to the dimming drive branch to detect drive branch current information of the dimming drive branch, and the constant current control unit 420 is connected to the current detection unit 440 to sample the drive branch current information of the dimming drive branch.

The current detection unit 440 may comprise a sampling resistor, one end of the sampling resistor is connected to the dimming drive branch to acquire the drive branch current, and the constant current control unit 420 is connected to the other end of the sampling resistor to determine the drive branch current information, so as to control the current-limiting switch unit 430 to operate.

Technical features in the above embodiments may be combined in any combinations. To make the description brief, all possible combinations of various technical features in the above embodiments are not described. However, it should be considered as being within the scope of this specification as long as there is no contradiction in the combinations of the technical features.

Although the embodiments of the present disclosure have been shown and described, it may be understood by those of ordinary skill in the art that various changes, modifications, substitutions, and alterations may be made to these embodiments without departing from the principle and purpose of the present disclosure, and the scope of the present disclosure is defined in the claims and equivalents thereof.

What is claimed is:

1. A LED module lamp control device using pull chain switch, comprising:
a light-emitting assembly;
a pull chain switch assembly configured to form a switch signal when being driven, wherein the switch signal is used to represent that the pull chain switch assembly is switched from a turn-on state to a turn-off state or from a turn-off state to a turn-on state;
a control module having a signal input terminal, wherein the signal input terminal of the control module is connected to the pull chain switch assembly to obtain a switch signal;
a power drive module configured to connect to a power supply; and
a dimming drive module connected to the light-emitting assembly to form at least part of a dimming drive branch, wherein the power drive module is connected to the dimming drive branch to supply power to the light-emitting assembly, the control module is connected to a controlled end of the dimming drive module, the control module forms a control signal according to the switch signal and outputs the control signal to control the dimming drive module to adjust a brightness, a color temperature or on/off of the light-emitting assembly;
wherein the pull chain switch assembly comprises a base shell, a rotating wheel and a chain, the base shell is provided with a first electrical connection terminal and a second electrical connection terminal, the control module is connected to the first electrical connection terminal and the second electrical connection terminal, the rotating wheel is rotatably arranged on the base shell, the rotating wheel is provided with a conductive part, the chain is connected to the rotating wheel, pulling of the chain is capable of driving the rotating wheel to rotate to switch at least between a first position and a second position, in the first position state, one end of the conductive part is in conductive contact with the first electrical connection terminal and an other end of the conductive part is in conductive contact with the second electrical connection terminal, and in the second position state, the conductive part is separated from the first electrical connection terminal and the second electrical connection terminal.

2. The LED module lamp control device using pull chain switch according to claim 1, wherein a filter capacitor is connected between the first electrical connection terminal and the second electrical connection terminal.

3. The LED module lamp control device using pull chain switch according to claim 1, further comprising a filter capacitor, wherein the first electrical connection terminal is connected to the control module, the second electrical connection terminal is connected to one end of the filter capacitor, the other end of the filter capacitor is connected to the control module, and the other end of the filter capacitor is grounded.

4. A LED module lamp control device using pull chain switch, comprising:
 a light-emitting assembly;
 a pull chain switch assembly configured to form a switch signal when being driven, wherein the switch signal is used to represent that the pull chain switch assembly is switched from a turn-on state to a turn-off state or from a turn-off state to a turn-on state;
 a control module having a signal input terminal, wherein the signal input terminal of the control module is connected to the pull chain switch assembly to obtain a switch signal;
 a power drive module configured to connect to a power supply; and
 a dimming drive module connected to the light-emitting assembly to form at least part of a dimming drive branch, wherein the power drive module is connected to the dimming drive branch to supply power to the light-emitting assembly, the control module is connected to a controlled end of the dimming drive module, the control module forms a control signal according to the switch signal and outputs the control signal to control the dimming drive module to adjust a brightness, a color temperature or on/off of the light-emitting assembly;
 wherein the dimming drive module comprises a first switching transistor and a second switching transistor, the light-emitting assembly comprises a first lamp group and a second lamp group with different colors, the first switching transistor is connected to the first lamp group to form a first series branch, the second switching transistor is connected to the second lamp group to form a second series branch, the power drive module is connected to the first series branch and the second series branch to supply power to the first series branch and the second series branch, and the control module is connected to a controlled end of the first switching transistor and a controlled end of the second switching transistor.

5. The LED module lamp control device using pull chain switch according to claim 4, further comprising a coupling isolation module, wherein the control module is connected to the controlled end of the dimming drive module through the coupling isolation module.

6. The LED module lamp control device using pull chain switch according to claim 5, wherein the coupling isolation module comprises a first coupling isolation unit and a second coupling isolation unit, the control module is connected to the controlled end of the first switching transistor through the first coupling isolation unit, and the control module is connected to the controlled end of the second switching transistor through the second coupling isolation unit.

7. A LED module lamp control device using pull chain switch, comprising:
 a light-emitting assembly;
 a pull chain switch assembly configured to form a switch signal when being driven, wherein the switch signal is used to represent that the pull chain switch assembly is switched from a turn-on state to a turn-off state or from a turn-off state to a turn-on state;
 a control module having a signal input terminal, wherein the signal input terminal of the control module is connected to the pull chain switch assembly to obtain a switch signal;
 a power drive module configured to connect to a power supply; and
 a dimming drive module connected to the light-emitting assembly to form at least part of a dimming drive branch, wherein the power drive module is connected to the dimming drive branch to supply power to the light-emitting assembly, the control module is connected to a controlled end of the dimming drive module, the control module forms a control signal according to the switch signal and outputs the control signal to control the dimming drive module to adjust a brightness, a color temperature or on/off of the light-emitting assembly;
 wherein the power drive module comprises a rectifier unit, a constant current control unit and a current-limiting switch unit, an input end of the rectifier unit is connected to a power supply, an output end of the rectifier unit is connected to the dimming drive branch to supply power to the dimming drive branch, the constant current control unit is connected to the dimming drive branch to sample drive branch current information of the dimming drive branch, the current-limiting switch unit is connected to the dimming drive branch, the constant current control unit is connected to a controlled end of the current-limiting switch unit, and the constant current control unit controls a switching frequency of the current-limiting switch unit to adjust a magnitude of a drive branch current.

8. The LED module lamp control device using pull chain switch according to claim 7, wherein the power drive module further comprises a current detection unit, the current detection unit is connected to the dimming drive branch to detect drive branch current information of the dimming drive branch, and the constant current control unit is connected to the current detection unit to sample the drive branch current information of the dimming drive branch.

* * * * *